US012693489B2

(12) United States Patent　　　　(10) Patent No.:　US 12,693,489 B2
Chao et al.　　　　　　　　　　　　(45) Date of Patent:　　　Jul. 28, 2026

(54) DRIVING MECHANISM

(71) Applicant: Actutek Corporation, Taoyuan City (TW)

(72) Inventors: Chen-Hung Chao, Taoyuan City (TW); Kun-Shih Lin, Taoyuan City (TW); Wei-Jhe Shen, Taoyuan City (TW); De Shiang Chen, Taoyuan City (TW); Sin-Jhong Song, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 315 days.

(21) Appl. No.: 18/504,461

(22) Filed: Nov. 8, 2023

(65) Prior Publication Data

US 2025/0147265 A1　　May 8, 2025

(51) Int. Cl.
　　*G02B 7/04*　　　　(2021.01)
(52) U.S. Cl.
　　CPC ........ *G02B 7/04* (2013.01); *G03B 2205/0069* (2013.01)

(58) Field of Classification Search
CPC ...................................................... G02B 7/04
See application file for complete search history.

(56) References Cited

U.S. PATENT DOCUMENTS

2021/0302690 A1*　9/2021　Lin ................... H02K 41/0356

FOREIGN PATENT DOCUMENTS

CN　　　219065853 U　　5/2023

OTHER PUBLICATIONS

Office Action of CN Application No. 202323016643.9 dated Jun. 17, 2024, 1 page.

* cited by examiner

*Primary Examiner* — Edmond C Lau

(74) *Attorney, Agent, or Firm* — MUNCY, GEISSLER, OLDS & LOWE, P.C.

(57)　　　　　　　ABSTRACT

A driving mechanism for moving an optical element is provided. The driving mechanism includes a fixed part, a movable part, and a driving assembly. The movable part is movably connected to the fixed part for holding the optical element. The driving assembly is configured for moving the movable part relative to the fixed part.

17 Claims, 11 Drawing Sheets

DRIVING MECHANISM

BACKGROUND OF THE INVENTION

Field of the Invention

The present invention relates to a driving mechanism, and, in particular, to a driving mechanism for moving an optical element.

Description of the Related Art

In existing dual-lens camera systems, two lens driving modules are usually arranged close to each other, and as a result, magnetic interference between the magnets of the two lens driving modules is likely to occur, causing the focus speed and accuracy of the lenses to be adversely affected. Therefore, what is needed is a dual-lens camera system that can prevent the magnetic interference between the two lens driving modules.

BRIEF SUMMARY OF THE INVENTION

An embodiment of the present invention provides a driving mechanism for moving an optical element. The driving mechanism includes a fixed part, a movable part, and a driving assembly. The movable part is movably connected to the fixed part for holding the optical element. The driving assembly is configured for moving the movable part relative to the fixed part.

In some embodiments, the driving mechanism further includes a thin magnetic-permeable element, wherein the fixed part has a housing and a base connected to each other, and the driving assembly has a coil and a magnetic element, wherein the coil is disposed on the movable part, the magnetic element and the movable part are received in the housing, and the magnetic-permeable element has a shielding portion located between the magnetic element and the sidewall of the housing.

In some embodiments, the magnetic permeability of the magnetic-permeable element is greater than that of the housing.

In some embodiments, the shielding portion of the magnetic-permeable element is angled relative to the sidewall of the housing.

In some embodiments, a gap is formed between the shielding portion of the magnetic-permeable element and the sidewall of the housing.

In some embodiments, the driving mechanism further includes a glue disposed in the gap.

In some embodiments, the shielding portion has a first segment and a second segment. The second segment is not parallel to the first segment.

In some embodiments, the first segment is parallel to the sidewall of the housing, and the second segment is angled relative to the sidewall of the housing.

In some embodiments, the first segment and the housing are connected to each other by welding.

In some embodiments, a gap is formed between the second segment and the sidewall of the housing.

In some embodiments, the driving mechanism further includes a glue disposed in the gap.

In some embodiments, the driving mechanism further includes an upper resilient element connecting the movable part to the housing, wherein the upper resilient element forms several slots, and the magnetic-permeable element forms a hole, wherein the slots and the hole at least partially overlap when viewed in a direction parallel to the optical axis of the optical element.

In some embodiments, the upper resilient element further forms several ribs between the slots, and the ribs and the hole at least partially overlap when viewed in the direction parallel to the optical axis of the optical element.

In some embodiments, the housing has a top portion, the sidewall is connected between the top portion and the base, and a depressed structure is formed at a corner of the top portion. The upper resilient element is disposed on the depressed structure and located between the depressed structure and the magnetic-permeable element.

In some embodiments, the slots, the hole and the depressed structure at least partially overlap when viewed in the direction parallel to the optical axis of the optical element.

In some embodiments, a part of the upper resilient element is clamped between the magnetic element and the depressed structure.

In some embodiments, the upper resilient element has an inner connection portion, an outer connection portion, and a plurality of deformable portions connected between the inner and outer connection portions, the inner connection portion is connected to the movable part, the outer connection portion is connected to the fixed part, and the slots are formed on the outer connection portion.

In some embodiments, the outer connection portion has a quadrilateral structure, and the slots are arranged one or several corners of the outer connection portion.

In some embodiments, the magnetic-permeable element has a quadrilateral structure, and the hole is located at a corner of the magnetic-permeable element.

In some embodiments, the optical element has an optical axis, and the magnetic-permeable element has a U-shaped structure when viewed in a direction perpendicular to the optical axis.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
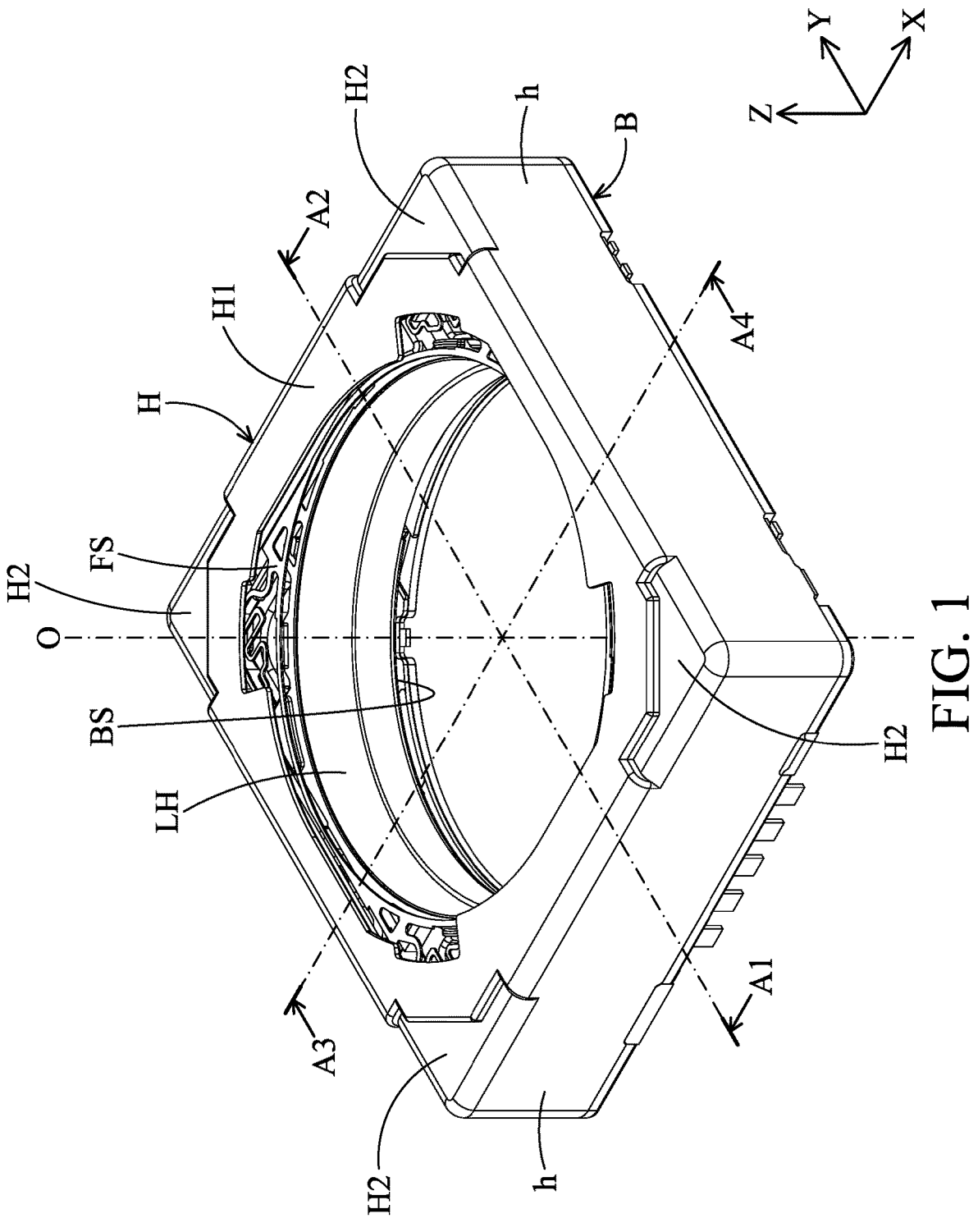
FIG. 1 shows a perspective diagram of a driving mechanism 100 in accordance with an embodiment of the invention.
Figure 2:
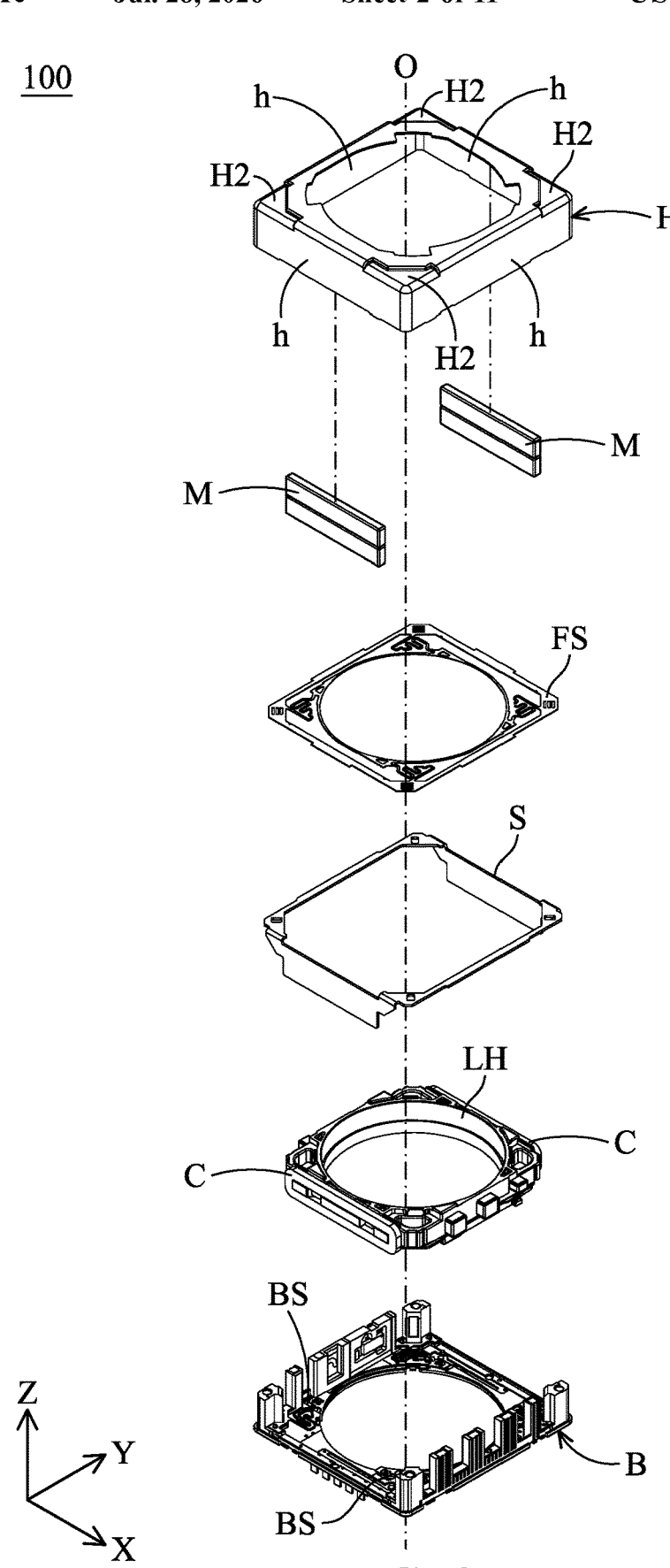
FIG. 2 shows an exploded view of the driving mechanism 100 in FIG. 1.
Figure 3:
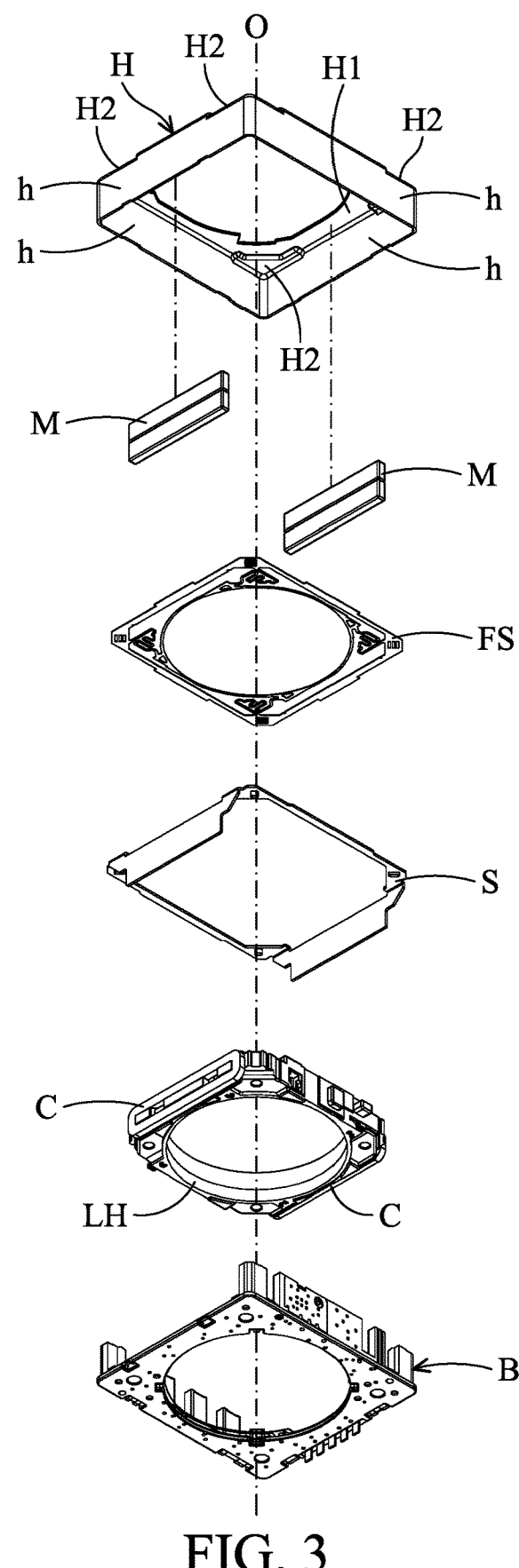
FIG. 3 shows another exploded view of the driving mechanism 100 in FIG. 1.

FIG. 1 shows a perspective diagram of a driving mechanism 100 in accordance with an embodiment of the invention. FIG. 2 shows an exploded view of the driving mechanism 100 in FIG. 1. FIG. 3 shows another exploded view of the driving mechanism 100 in FIG. 1.

Referring to FIGS. 1-3, the driving mechanism 100 in this embodiment is a Voice Coil Motor (VCM) which may be disposed in a cell phone or other portable electronic device for driving an optical element (e.g. optical lens) to move, thereby achieving the function of auto-focusing (AF) or Optical Image Stabilization (OIS).

The driving mechanism 100 primarily comprises a housing H, a base B, a magnetic-permeable element S, a holder LH, at least an upper resilient element FS, at least a lower resilient element BS, at least a magnetic element M, and at least a coil C. In this embodiment, the housing H has a hollow structure affixed to the base B. Here, the housing H and the base B form a fixed part of the driving mechanism 100.

Additionally, the holder LH is movably received in the housing H, and an optical element (not shown) is disposed in the holder LH. The holder LH forms a movable part that is movable relative to the fixed part (the housing H and the base B).

The holder LH is connected to the housing H and the base B via the upper and lower resilient elements FS and BS (e.g. sheet springs), so that the holder LH can be suspended within the driving mechanism 100. With the configuration as described above, external light can enter the driving mechanism 100 substantially along the optical axis O of the optical element, and light can propagate through the optical element to an image sensor (not shown) below the base B to form a digital image.

It should be noted that two oval-shaped coils C are disposed on opposite sides of the holder LH, and two magnetic elements M (e.g. magnets) are disposed on the inner sides of the housing H and located corresponding to the coils C. The coils C and the magnetic elements M constitute a driving assembly for impelling the movable part (holder LH) relative to the fixed part (the housing H and the base B) along the optical axis O.

When a current signal is applied to the coils C, an electromagnetic force can be generated by the coils C and the magnets M, so that the holder LH and the optical element received therein can be driven to move relative to the fixed part (the housing H and the base B) along the optical axis O (Z direction). Hence, the function of auto-focusing (AF) or Optical Image Stabilization (OIS) can be achieved.

FIGS. 1-3 further show that the housing H has a top portion H1 and four sidewalls h extend from the top portion H1 to the base B. Moreover, four depressed structures H2 are formed at the four corners of the top portion H1, and each of the depressed structures H2 is connected to two adjacent sidewalls h. During assembly, the upper resilient element FS is affixed between the depressed structures H2 and the magnetic-permeable element S.

Figure 4:
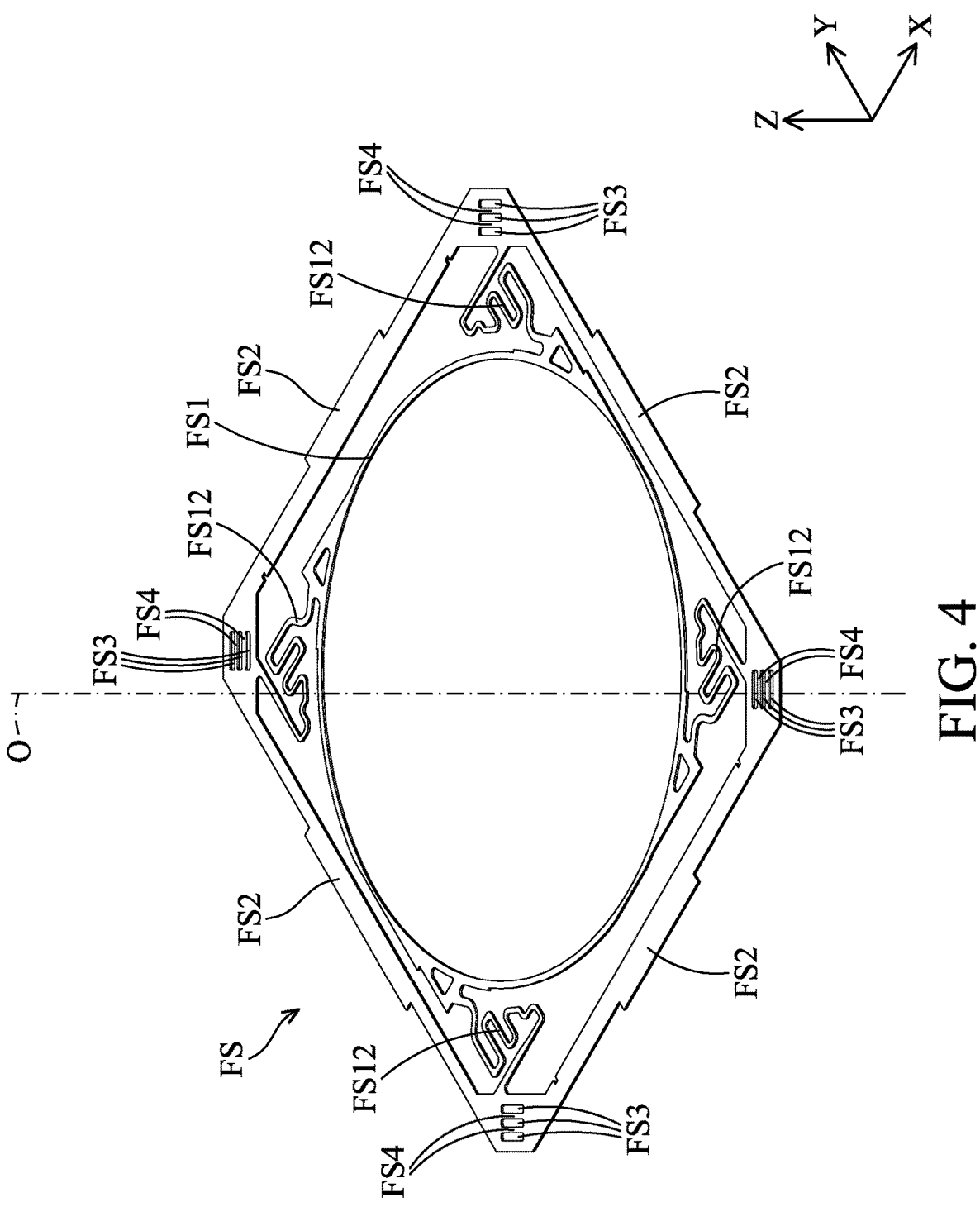
FIG. 4 is an enlarged view of the upper resilient element FS in FIG. 2.

FIG. 4 is an enlarged view of the upper resilient element FS in FIG. 2. Referring to FIG. 4, the upper resilient element FS comprises an inner connection portion FS1, an outer connection portion FS2, and a plurality of deformable portions FS12. The inner connection portion FS1 is adhered to the holder LH (movable part), the outer connection portion FS2 is affixed to the housing H (fixed part), and the deformable portions FS12 are connected between the inner and outer portions FS1 and FS2.

It should be noted that several slots FS3 are formed at the four corners of the outer connection portions FS2, and a plurality if ribs FS4 are formed between the slots FS3. The slots FS3 can receive the glue for adhering the magnetic-permeable element S to the metal housing H. Additionally, the slots FS3 and the ribs FS4 can also be used for welding/ soldering the magnetic-permeable element S to the metal housing H. Therefore, the connection strength between the upper resilient element FS, the magnetic-permeable element S, and the metal housing H can be increased.

Figure 5:
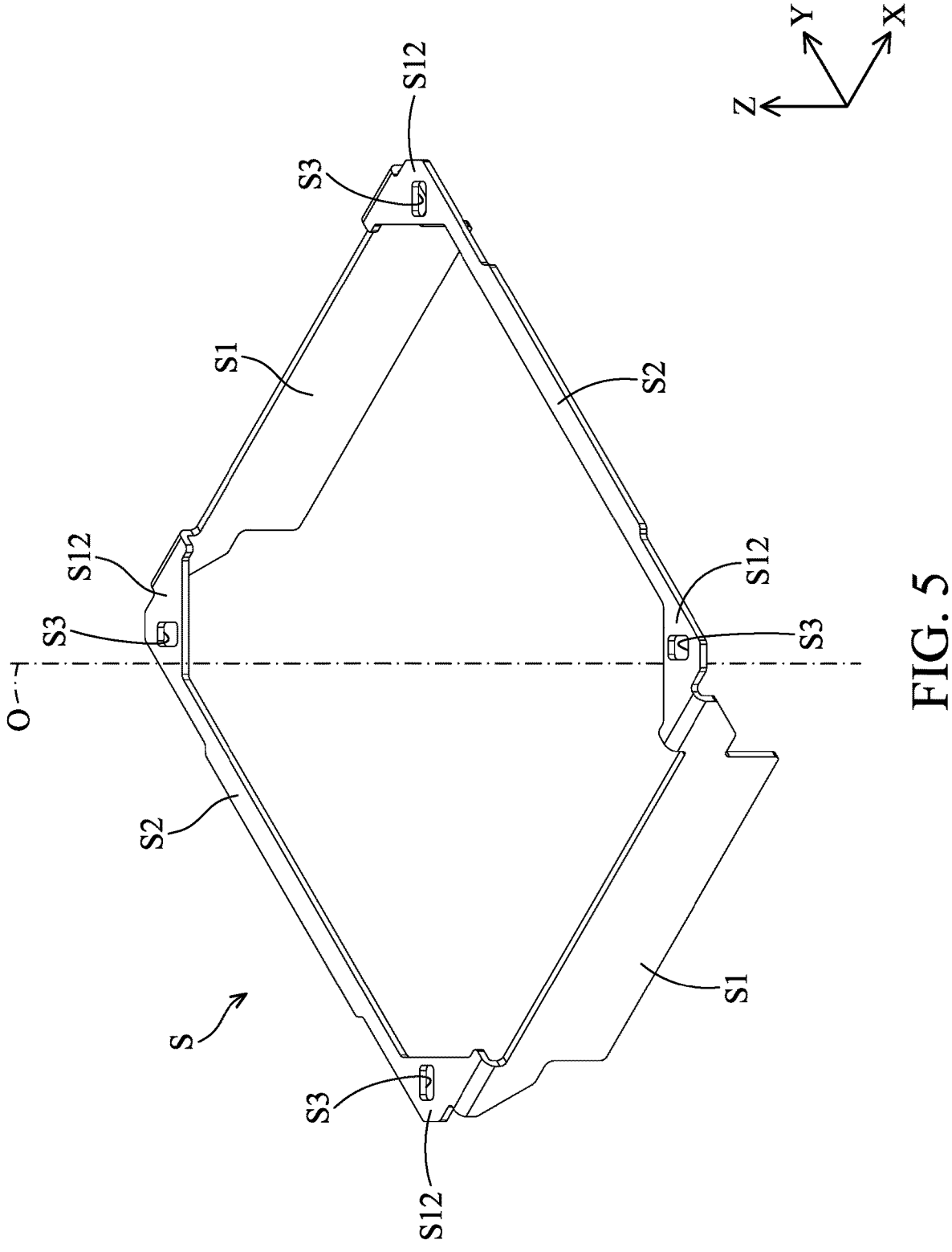
FIG. 5 is an enlarged view of the magnetic-permeable element S in FIG. 2.

FIG. 5 is an enlarged view of the magnetic-permeable element S in FIG. 2. Referring to FIG. 5, the magnetic-permeable element S has a thin and hollow quadrilateral structure. The magnetic-permeable element S primarily comprises two shielding portions S1, two longitudinal extension portions S2, and four corner portions S12. The shielding portions S1 are substantially parallel to the optical axis (Z axis). The corner portions S12 have a triangular shape and connected between the shielding portions S1 and the extension portions S2. Specifically, the shielding portions S1 and the extension portions S2 face in different directions, however, the extension portions S2 and the corner portions S12 face in the same direction. The shielding portions S1 are bent relative to the corner portions S12 to form the magnetic-permeable element S.

In this embodiment, the housing H has low magnetic permeability, and the magnetic permeability of the magnetic-permeable element S is greater than that of the housing H. After assembly, each shielding portion S1 of the magnetic-permeable element S is located between the magnetic element M and the sidewall h of the housing H. Therefore, the magnetic element M can be protected, and magnetic Interference from the electronic components outside the driving mechanism 100 can also be prevented.

Still referring to FIG. 5, each corner portion S12 of the magnetic-permeable element S forms a hole S3. The holes S3 can receive the glue for adhering the magnetic-permeable element S to the upper resilient element FS. Additionally, the holes S3 can also be used for welding/soldering the magnetic-permeable element S to the metal housing H. Therefore, the connection strength between the upper resilient element FS, the magnetic-permeable element S, and the metal housing H can be increased.

Figure 6:
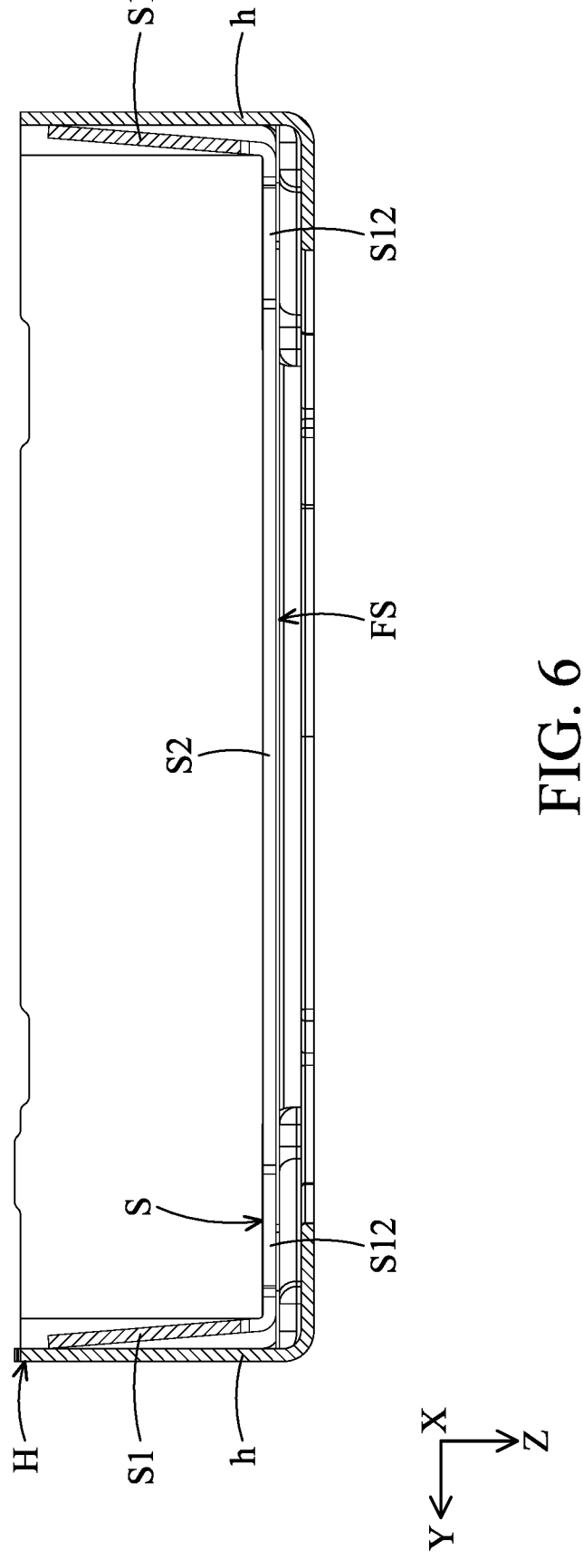
FIG. 6 is a sectional view of the housing H, the upper resilient element FS, and the magnetic-permeable element S after assembly.
Figure 7:
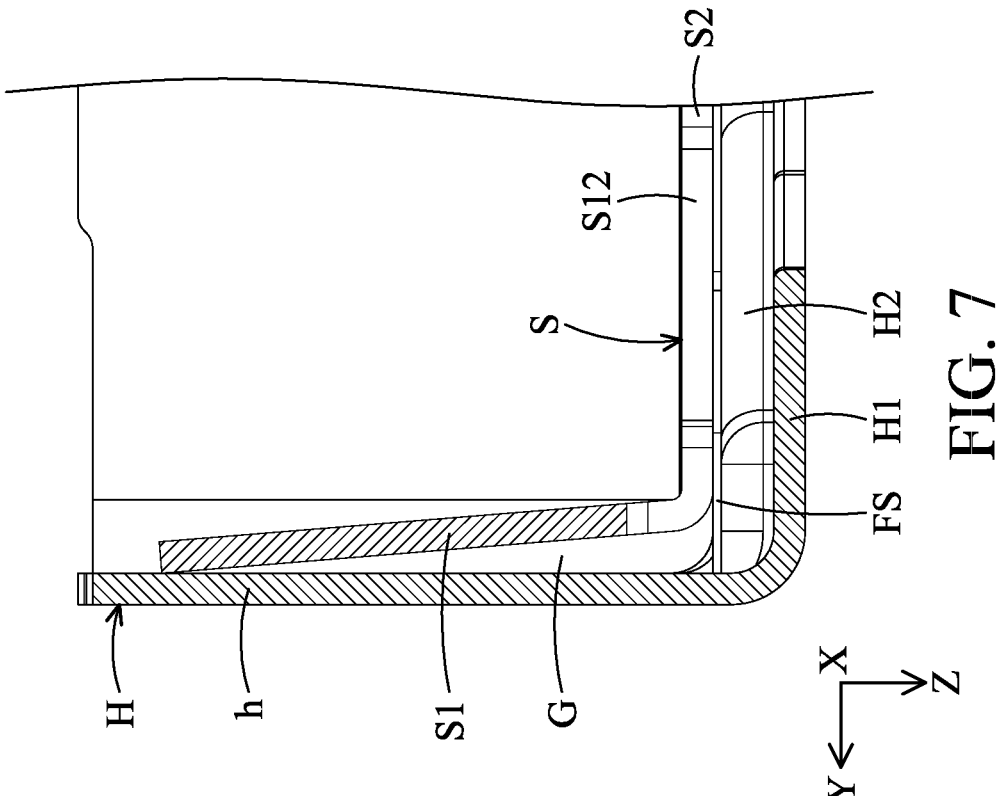
FIG. 7 is a partial enlarged view of the housing H, the upper resilient element FS, and the magnetic-permeable element S in FIG. 6.

FIG. 6 is a sectional view of the housing H, the upper resilient element FS, and the magnetic-permeable element S after assembly. FIG. 7 is a partial enlarged view of the housing H, the upper resilient element FS, and the magnetic-permeable element S in FIG. 6.

Referring to FIGS. 6 and 7, when viewed in a direction (along the X axis) that is perpendicular to the optical axis O, the magnetic-permeable element S has a U-shaped structure. To ensure that the magnetic-permeable element S is in contact with the sidewall h of the housing H to facilitate easy assembly of the driving mechanism 100, the shielding portion S1 of the magnetic-permeable element S is angled relative to the sidewall h. Hence, a gap G is formed between the shielding portion S1 and the sidewall h (FIG. 7). The gap G can be used to receive the glue and increase adhesion area between the housing H and the magnetic-permeable element S. Therefore, separation of the magnetic-permeable element S from the housing H can be efficiently prevented.

Moreover, as shown in FIGS. 6 and 7, the upper resilient element FS is affixed to the depressed structures H2 and connected between the magnetic-permeable element S and the depressed structures H2.

Figure 8:
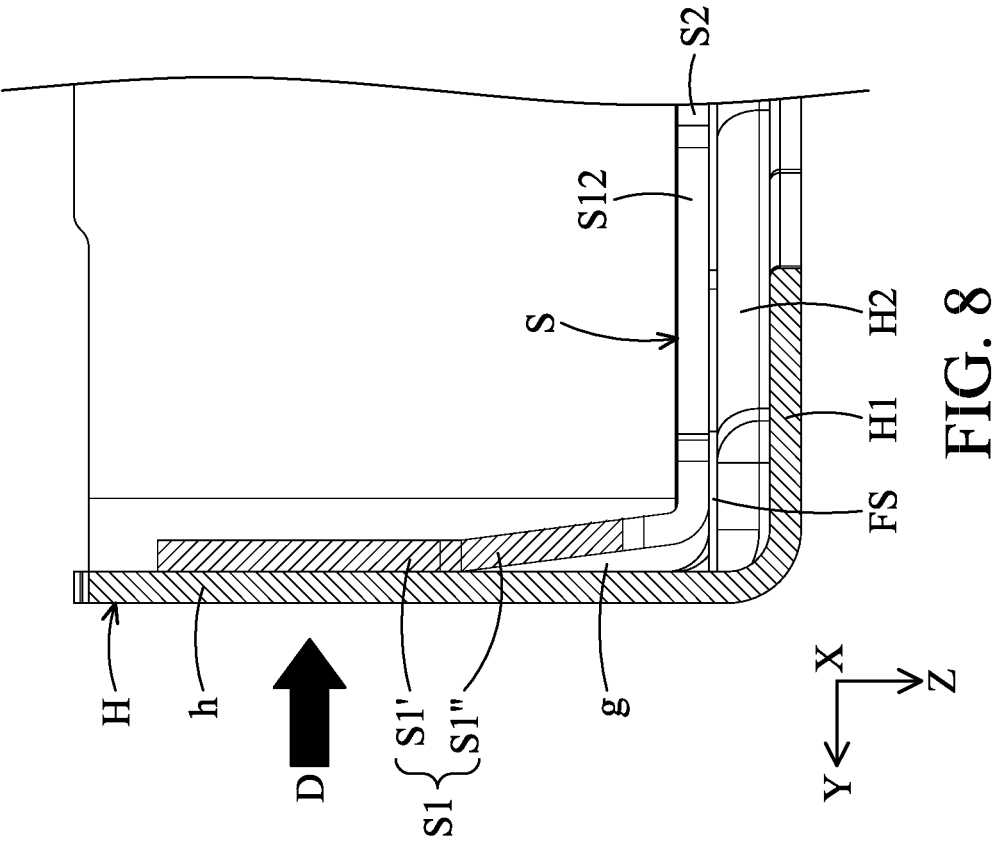
FIG. 8 is a partial sectional view of the housing H, the upper resilient element FS, and the magnetic-permeable element S after assembly, in accordance with another embodiment of the invention.

FIG. 8 is a partial sectional view of the housing H, the upper resilient element FS, and the magnetic-permeable element S after assembly, in accordance with another embodiment of the invention.

Referring to FIG. 8, in another embodiment, the shielding portion S1 of the magnetic-permeable element S has a first segment S1' and a second segment S1". The first segment S1' is parallel to the sidewall h, and the second segment S1" is connected between the first segment S1' and the corner portion S12 of the magnetic-permeable element S. Specifically, the second segment S1" is angled relative to the sidewall h of the housing H. That is, the first segment S1' and a second segment S1" are not parallel to each other.

A gap g is formed between the second segment S1" and the sidewall h. The gap G can be used to receive the glue and increase adhesion area between the housing H and the magnetic-permeable element S. Therefore, separation of the magnetic-permeable element S from the housing H can be efficiently prevented.

It should be noticed that the first segment S1' of the magnetic-permeable element S is parallel to and in contact with the sidewall h of the housing H. In this configuration, a welding process can be performed from the outer side of the housing H, as the arrow D indicates in FIG. 8, whereby the sidewall h and the shielding portion S1 (first segment S1') can be firmly affixed to each other by welding.

Figure 9:
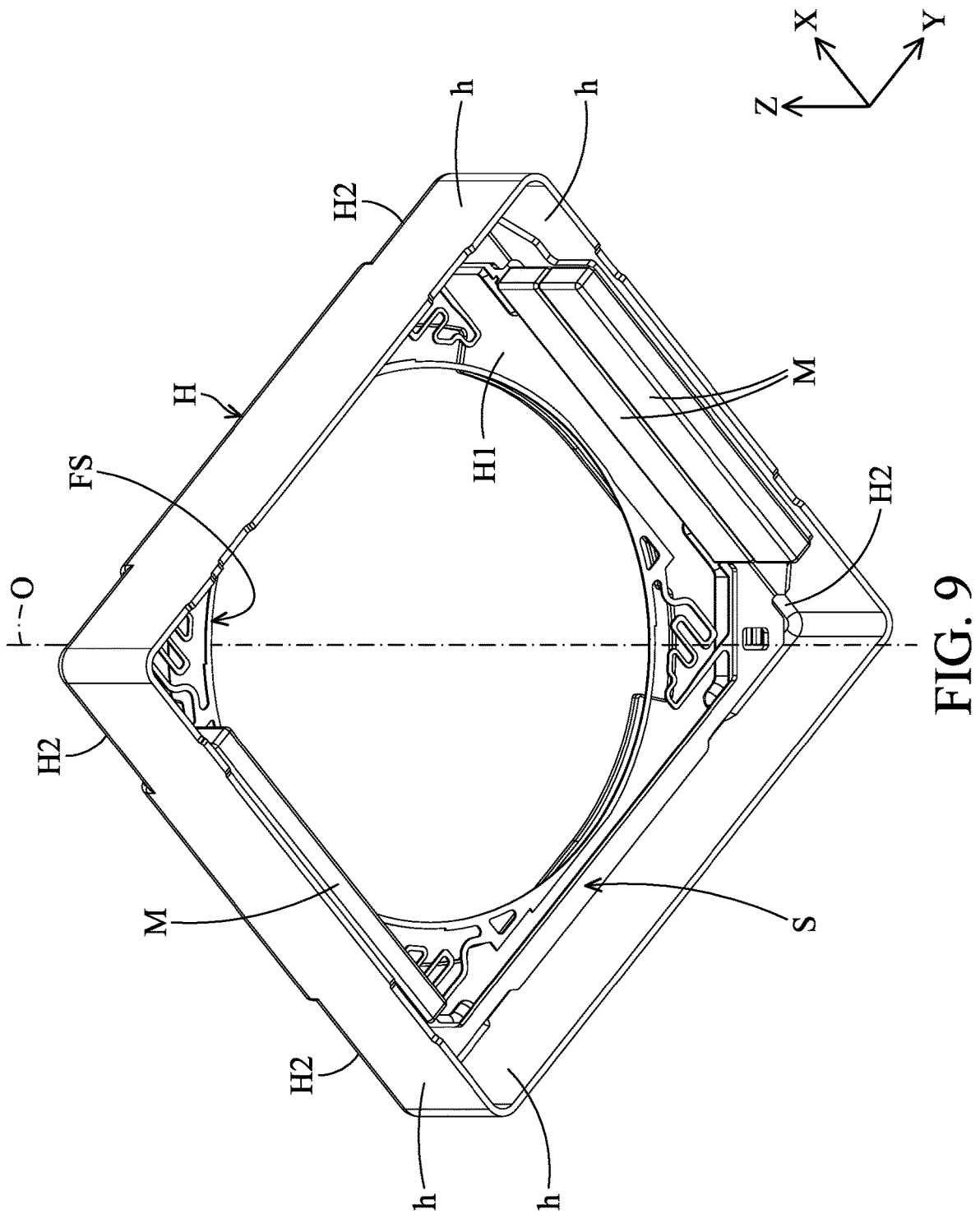
FIG. 9 is a perspective diagram of the housing H, the upper resilient element FS, and the magnetic-permeable element S after assembly.
Figure 10:
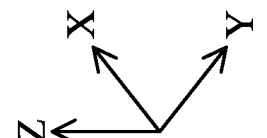
FIG. 10 is a partial enlarged view of the housing H, the upper resilient element FS, and the magnetic-permeable element S in FIG. 9.

FIG. 9 is a perspective diagram of the housing H, the upper resilient element FS, the magnetic elements M, and the magnetic-permeable element S after assembly. FIG. 10 is a partial enlarged view of the housing H, the upper resilient element FS, the magnetic elements M, and the magnetic-permeable element S in FIG. 9.

During assembly of the driving mechanism 100, the upper resilient element FS and the magnetic-permeable element S are sequentially stacked on the inner surface of the housing H. Referring to FIGS. 9 and 10, the slots FS3 and the ribs FS4 on the outer connection portion FS2 of the upper resilient element FS at least partially overlap the holes S3 on the corner portions S12 of the magnetic-permeable element S when viewed in the direction parallel to the optical axis O (Z axis). Additionally, the slots FS3 and holes S3 overlap the recessed structures H2 at the corners of the top portion H1 of the housing H when viewed along the optical axis O (Z axis).

The slots FS3 and the holes S3 can be used to receive the glue, thus increasing adhesion area between the upper resilient element FS and the magnetic-permeable element S. Additionally, the slots FS3 and the holes S3 can also be used for welding/soldering the upper resilient element FS, the magnetic-permeable element S, and the metal housing H to each other. Therefore, the connection strength between the upper resilient element FS, the magnetic-permeable element S, and the metal housing H can be increased.

Figure 11:
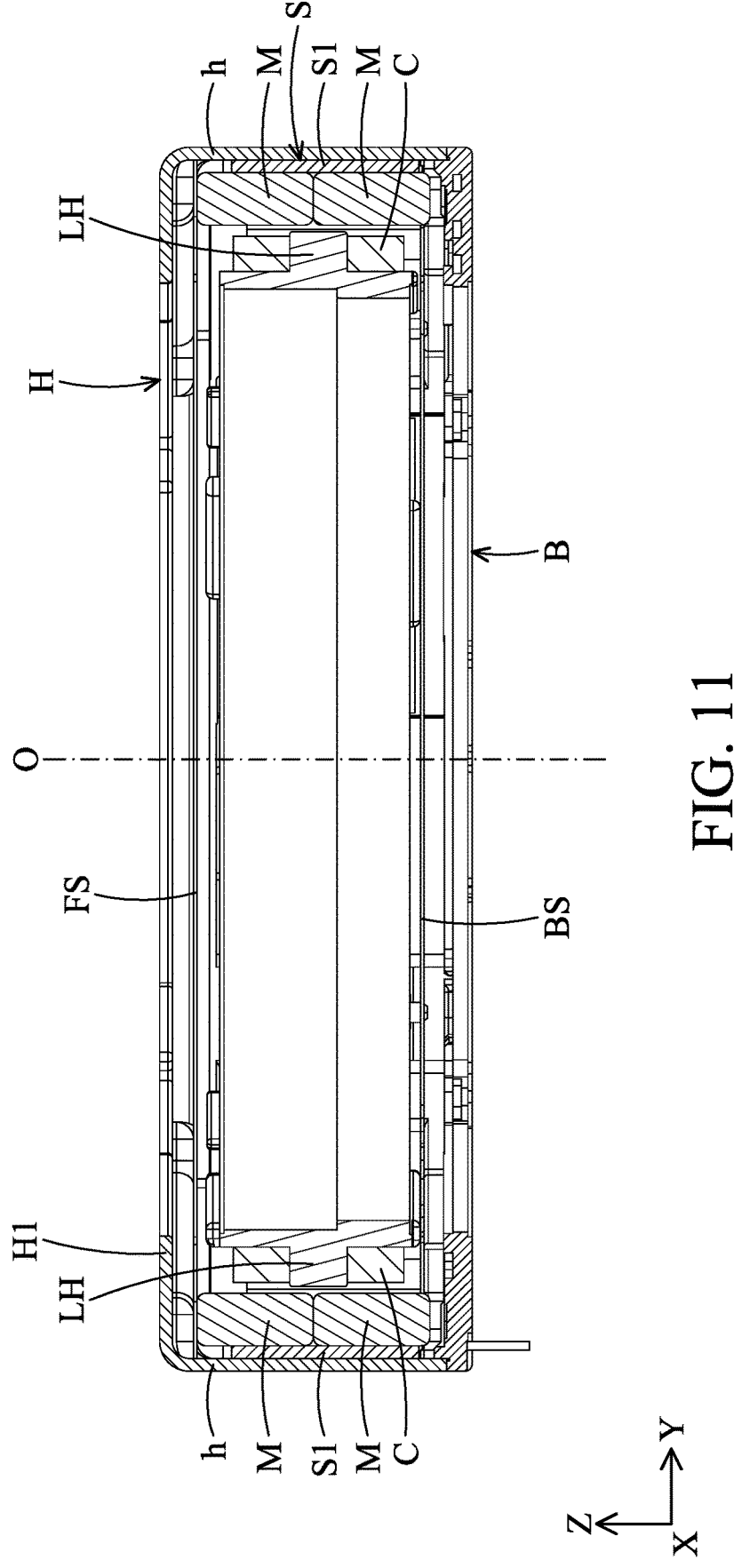
FIG. 11 is a sectional view taken along line A1-A2 in FIG. 1.
Figure 12:
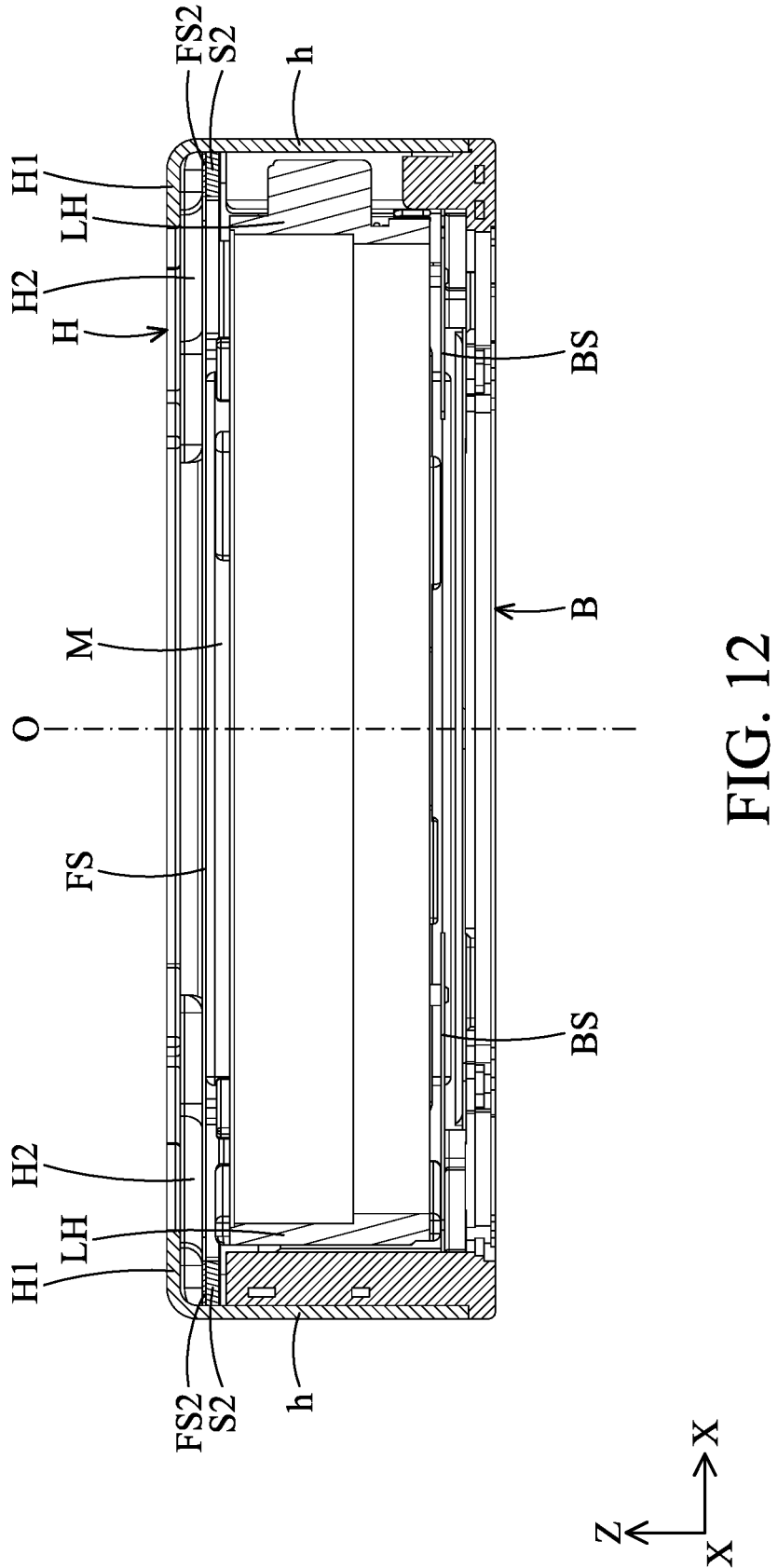
FIG. 12 is a sectional view taken along line A3-A4 in FIG. 1.

FIG. 11 is a sectional view taken along line A1-A2 in FIG. 1. FIG. 12 is a sectional view taken along line A3-A4 in FIG. 1.

Referring to FIG. 11, each shielding portion S1 of the magnetic-permeable element S is located between the magnetic element M and the sidewall h of the housing H. Therefore, the magnetic element M can be protected, and magnetic Interference from the electronic components outside the driving mechanism 100 can also be prevented. Moreover, a part of the upper resilient element FS is clamped between the magnetic element M and the depressed structure H2 of the housing H.

As shown in FIG. 12, the extension portion S2 of the magnetic-permeable element S at least partially overlap the outer connection portion FS2 of the upper resilient element FS when viewed in the direction parallel to the optical axis O (Z axis).

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification.

As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving mechanism for moving an optical element, comprising:
   a fixed part, having a housing and a base connected to each other;
   a movable part, movably connected to the fixed part for holding the optical element;
   a driving assembly, configured for moving the movable part relative to the fixed part, wherein the driving assembly has a coil and a magnetic element, the coil is disposed on the movable part, and the magnetic element and the movable part are received in the housing; and
   a thin magnetic-permeable element, having a shielding portion located between the magnetic element and a sidewall of the housing, wherein a gap is formed between the shielding portion of the magnetic-permeable element and the sidewall of the housing.

2. The driving mechanism as claimed in claim 1, wherein the magnetic permeability of the magnetic-permeable element is greater than that of the housing.

3. The driving mechanism as claimed in claim 1, wherein the shielding portion of the magnetic-permeable element is angled relative to the sidewall of the housing.

4. The driving mechanism as claimed in claim 1, further comprising a glue disposed in the gap.

5. A driving mechanism for moving an optical element, comprising:
   a fixed part, having a housing and a base connected to each other;
   a movable part, movably connected to the fixed part for holding the optical element;
   a driving assembly, configured for moving the movable part relative to the fixed part, wherein the driving assembly has a coil and a magnetic element, the coil is disposed on the movable part, and the magnetic element and the movable part are received in the housing; and
   a thin magnetic-permeable element, having a shielding portion located between the magnetic element and a sidewall of the housing, wherein the shielding portion has a first segment and a second segment that is not parallel to the first segment.

6. The driving mechanism as claimed in claim 5, wherein the first segment is parallel to the sidewall of the housing, and the second segment is angled relative to the sidewall of the housing.

7. The driving mechanism as claimed in claim 6, wherein the first segment and the sidewall of the housing are connected to each other by welding.

8. The driving mechanism as claimed in claim 7, wherein a gap is formed between the second segment and the sidewall of the housing.

9. The driving mechanism as claimed in claim 8, further comprising a glue disposed in the gap.

10. A driving mechanism for moving an optical element, comprising:
   a fixed part, having a housing and a base connected to each other;
   a movable part, movably connected to the fixed part for holding the optical element;
   a driving assembly, configured for moving the movable part relative to the fixed part, wherein the driving assembly has a coil and a magnetic element, the coil is disposed on the movable part, and the magnetic element and the movable part are received in the housing;
   a thin magnetic-permeable element, having a shielding portion located between the magnetic element and a sidewall of the housing; and
   an upper resilient element, connecting the movable part to the housing, wherein the upper resilient element forms several slots, the magnetic-permeable element forms a hole, and the slots and the hole at least partially overlap when viewed in a direction parallel to an optical axis of the optical element,
   wherein the upper resilient element further forms several ribs between the slots, and the ribs and the hole at least partially overlap when viewed in the direction parallel to the optical axis of the optical element.

11. The driving mechanism as claimed in claim 10, wherein the housing has a top portion, the sidewall is connected between the top portion and the base, and a depressed structure is formed at a corner of the top portion, wherein the upper resilient element is disposed on the depressed structure and located between the depressed structure and the magnetic-permeable element.

12. The driving mechanism as claimed in claim 11, wherein the slots, the hole, and the depressed structure at least partially overlap when viewed in the direction parallel to the optical axis of the optical element.

13. The driving mechanism as claimed in claim 11, wherein a part of the upper resilient element is clamped between the magnetic element and the depressed structure.

14. The driving mechanism as claimed in claim 10, wherein the upper resilient element has an inner connection portion, an outer connection portion, and a plurality of deformable portions connected between the inner and outer connection portions, the inner connection portion is connected to the movable part, the outer connection portion is connected to the fixed part, and the slots are formed on the outer connection portion.

15. The driving mechanism as claimed in claim 14, wherein the outer connection portion has a quadrilateral structure, and the slots are arranged at at least a corner of the outer connection portion.

16. The driving mechanism as claimed in claim 10, wherein the magnetic-permeable element has a quadrilateral structure, and the hole is located at a corner of the magnetic-permeable element.

17. The driving mechanism as claimed in claim 10, wherein the optical element has an optical axis, and the magnetic-permeable element has a U-shaped structure when viewed in a direction perpendicular to the optical axis.

* * * * *